United States Patent [19]
Suda et al.

[11] Patent Number: 5,618,772
[45] Date of Patent: Apr. 8, 1997

[54] METHOD FOR PRODUCING CATALYST

[75] Inventors: Akihiko Suda; Yoshio Ukyo; Hideo Sobukawa; Toshio Kandori; Masayuki Fukui, all of Aichi, Japan

[73] Assignee: Kabushiki Kaisha Toyota Chuo Kenkyusho, Aichi-ken, Japan

[21] Appl. No.: 424,092

[22] Filed: Apr. 19, 1995

[30]     Foreign Application Priority Data

Apr. 20, 1994  [JP]  Japan ..................................... 6-081951

[51] Int. Cl.$^6$ ................................................... B01J 21/08
[52] U.S. Cl. ........................ 502/238; 502/303; 502/306; 502/324; 502/327; 502/328; 502/333; 502/334; 502/335; 502/336; 502/341; 502/332
[58] Field of Search ..................................... 502/232, 235, 502/238, 245, 263, 303, 341, 306, 324, 327, 328, 333, 334, 335, 336, 332

[56]                  References Cited

FOREIGN PATENT DOCUMENTS 1-230425   9/1989   Japan .
3-266985  11/1991   Japan .

OTHER PUBLICATIONS

Matsuda et al. Catalyst, 29(4), 1987, pp. 293–298 (Jap) English trans. included. 1987.
Catalyst, 29 (4) pp. 293–298 (1987) (Japan).
Chemical Equipment, 29 (2) pp. 134–137 (1987) (Japan).

*Primary Examiner*—Wayne Langel
*Assistant Examiner*—Amy M. Harding
*Attorney, Agent, or Firm*—Oblon, Spivak, McClelland, Maier & Neustadt, P.C.

[57]                  ABSTRACT

A method for producing a catalyst having high catalytic activity even at high temperatures of 1200° C. or higher. Fine alumina particles, of which 50% by weight or more have a particle size of 100 nm or less, are mixed with a catalytic component and a substance of inhibiting the sintering of fine alumina particles to form a slurry mixture. This slurry is dried and then calcined to obtain a porous catalyst. The fine alumina particles in the porous catalyst have a large specific surface area even at high temperatures and therefore the porous catalyst maintains its high catalytic activity even at high temperatures of 1200° C. or higher.

17 Claims, No Drawings

METHOD FOR PRODUCING CATALYST

BACKGROUND OF THE INVENTION

1. Field of the Invention

The present invention relates to a method for producing a catalyst containing alumina that can be used at high temperatures. In particular, it relates to a method for producing a catalyst that can be used for purifying exhaust gas to be discharged from internal combustion engines, etc.

2. Description of the Related Art

Heretofore, alumina (essentially γ-alumina, γ-$Al_2O_3$) has been employed as a catalytic support to be used at high temperatures, since it has a large specific surface area and has good thermal stability. For instance, a catalyst for purifying exhaust gas to be discharged from internal combustion engines of cars, etc. is always exposed to high temperatures of about 850° C., and even alumina only can be used as the support for the catalyst.

For fan heaters, gas turbine engines, etc., combustion techniques of using combustion catalyst have been developed so as to stabilize the combustion in them and to reduce nitrogen oxides (NOx) to be discharged from them. It is said that combustion catalyst for fan heaters require catalytic supports that can be used at 900° to 1200° C. while those for gas turbine engines require catalytic supports that can be used at 1100° to 1500° C. However, transition aluminas such as γ-alumina, etc. that are popularly used as catalytic supports because of its large specific surface area, are converted into α-alumina (α-$Al_2O_3$) at 1000° C. or higher while being rapidly sintered to have a reduced specific surface area (see Catalyst, 29 [4] 293-298 (1987)).

Since simple oxides cannot satisfy the above-mentioned requirements, catalysts of composite oxides have been studied. For example, La-β-$Al_2O_3$ and BaO-6$Al_2O_3$ are known to have relatively high heat resistance. La-β-$Al_2O_3$ having a ratio of La/Al of 5/95 has the highest thermal stability and has a specific surface area of 40 $m^2/g$ at 1200° C. However, it has a reduced specific surface area of 8 $m^2/g$ at 1400° C. BaO-6$Al_2O_3$ has a specific surface area of 50 $m^2/g$ at 1200° C. but has a reduced specific surface area of 10 $m^2/g$ at 1400° C. (see Chemical Equipment, 29 [2] 134-137 (1987)).

Mullite composed of alumina and silica (3$Al_2O_3$.2$SiO_2$) is known as one of compounds that are the most stable at high temperatures, and it has been considered to use a porous material made of alumina and silica having the composition of mullite, as supports for catalysts, etc.

As the conventional method for producing a porous material made of alumina and silica having the mullite composition, there is known a method of mixing an alumina hydrosol and a silica hydrosol at the mullite composition (3$Al_2O_3$.2$SiO_2$) followed by sintering the resulting mixture (see Japanese Patent Laid-Open No. 3-266985).

The porous material produced by said known method has a specific surface area of 47 $m^2/g$ at 1200° C. but has a reduced specific surface area of 10 $m^2/g$ at 1300° C. Thus, the reduction in the specific surface area of this porous material at high temperatures is noticeable.

The reduction in the specific surface area of conventional porous materials containing alumina at high temperatures is large.

Having studied this phenomenon, we, the present inventors have considered the reasons of this phenomenon as follows:

The conventional porous materials containing alumina that have heretofore been used as catalytic supports are produced by a wet process, and the alumina in these materials is γ-alumina. The specific surface area of this γ-alumina is suddenly reduced at high temperatures of 1000° C. or higher. This is because the γ-alumina is converted to an α-phase at such high temperatures by phase transition, resulting in rapid growth of the alumina particles.

The γ-alumina produced by a wet process comprises fine primary particles having a particle size of several to several tens μm or less and therefore has a large specific surface area of 100 $m^2/g$ or more, but the particles exist as firmly agglomerated secondary particles having a μm-order particle size. Therefore, when once α-alumina is formed in these particles, the γ-phase is easily converted into an α-phase in almost all the agglomerated secondary particles and the α-phase transition is rapid. When silica or oxides of alkaline earth metals or rare earth metals are added to such large secondary particles of γ-alumina, the heat resistance of said γ-alumina can be improved in some degree. However, since the α-phase transition occurs from the agglomerated sites and expands into the whole of the particles, the specific surface area of the resulting α-phase particles is reduced.

The same shall apply to δ-phase alumina and θ-phase alumina comprising a number of agglomerated particles.

SUMMARY OF THE INVENTION

The present invention has been attained in consideration of the above-mentioned problems, and its object is to provide a method for producing a catalytic porous material still having a large specific surface area even at high temperatures of 1200° C. or higher, in which fine primary alumina particles having a particle size of several to several tens μm or less that carry a catalyst thereon or form a catalytic layer along with catalyst particles are prevented from being sintered.

We, the present inventors have found that a catalytic porous material still having a large specific surface area even at high temperatures of 1200° C. or higher can be obtained by any of the following methods, while preventing primary alumina particles having a mean particle size of 100 nm or less from being sintered.

As the first aspect, the present invention provides a method for producing a catalyst comprising the steps of:

mixing a catalytic component, alumina particles of which 50% by weight or more have a particle size of 100 nm or less, and at least one member of a substance group to form a slurry mixture;

drying the resulting slurry mixture; and calcining the dried mixture, said substance group consisting of:

(a) silica particles, of which 50% by weight or more have a particle size of 100 nm or less;
(b) a sol dispersion comprising silica particles, of which 50% by weight or more have a particle size of 100 nm or less;
(c) a solution of silica;
(d) particles each of which is composed of both alumina and silica, 50% by weight or more of the particles having a particle size of 100 nm or less;
(e) a sol dispersion of particles each of which is composed of both alumina and silica, 50% by weight or more of the particles having a particle size of 100 nm or less;

(f) particles of barium compound, of which 50% by weight or more have a particle size of 100 nm or less;

(g) a sol dispersion of barium compound particles, of which 50% by weight or more have a particle size of 100 nm or less;

(h) a solution of a barium compound;

(i) particles of lanthanum compound, of which 50% by weight or more have a particle size of 100 nm or less; and (j) a solution of a lanthanum compound.

As the second aspect, the present invention provides a method for producing a catalyst comprising the steps of mixing a catalytic component, alumina particles of which 50% by weight or more have a particle size of 100 nm or less, and at least one member of an alkoxide group to form a slurry mixture, and hydrolyzing said at least one member of an alkoxide group:

drying the resulting slurry mixture; and calcining the dried mixture, said alkoxide group consisting of:

(k) a silicon alkoxide;

(l) an alkoxide of particles each of which is composed of both alumina and silica;

(m) a barium alkoxide; and (n) a lanthanum alkoxide.

As the third aspect, the present invention provides a catalyst comprising:

alumina particles, 50% by weight or more thereof having a particle size of 100 nm or less;

a substance of at least one of silica, a barium compound and a lanthanum compound, said alumina particles and said substance being present as primary or secondary particles, or said substance adhering onto each of said alumina particles, 50% by weight or more of the total of said alumina particles and said substance having a particle size of 100 nm or less; and a catalytic component carried on said alumina particles and said substance.

The present invention is based on the above-mentioned findings, providing a method for producing a catalyst comprising fine particles of a porous alumina material still having a large specific surface area even at high temperatures of 1200° C. or higher, wherein said fine particles each carry a catalytic component or have been each combined with other fine particles each having catalytic activities.

The above and other objects, features and advantages of the present invention will become more apparent from the following description in which preferred embodiments of the invention are shown by way of illustrative examples.

DETAILED DESCRIPTION OF THE INVENTION

[Method for Producing Catalyst—First Aspect]

The first aspect of the present invention for producing a catalyst comprises the steps of:

mixing a catalytic component, alumina particles of which 50% by weight or more have a particle size of 100 nm or less, and at least one member of a substance group to form a slurry mixture;

drying the resulting slurry mixture; and calcining the dried mixture, said substance group consisting of:

(a) silica particles, of which 50% by weight or more have a particle size of 100 nm or less;

(b) a sol dispersion comprising silica particles, of which 50% by weight or more have a particle size of 100 nm or less;

(c) a solution of silica;

(d) particles each of which is composed of both alumina and silica, 50% by weight or more of the particles having a particle size of 100 nm or less;

(e) a sol dispersion of particles each of which is composed of both alumina and silica, 50% by weight or more of the particles having a particle size of 100 nm or less;

(f) particles of barium compound, of which 50% by weight or more have a particle size of 100 nm or less;

(g) a sol dispersion of barium compound particles, of which 50% by weight or more have a particle size of 100 nm or less;

(h) a solution of a barium compound;

(i) particles of lanthanum compound, of which 50% by weight or more have a particle size of 100 nm or less; and (j) a solution of a lanthanum compound.

It is desirable that alumina to be used in the method of the present invention does not contain, in its particles, water, such as crystal water, constitution water, etc. If alumina particles containing therein water, such as crystal water, constitution water, etc. are mixed according to the method of the present invention, the water is released from the resulting mixture at 500° to 1000° C. when the mixture is dried to remove the mixing medium therefrom or when the dried mixture is calcined with the result that the calcined mixture is sintered to have a reduced specific surface area. However, water may exist around the alumina particles in the present invention.

50% by weight or more of the alumina particles for use in the present invention shall have a particle size of 100 nm or less. More preferably, 50% by weight or more of the alumina particles have a particle size falling within the range of from 8 to 100 nm. Even more preferably, 50% by weight or more of the alumina particles have a particle size falling within the range of from 8 to 100 nm and the alumina particles have such a narrow particle size distribution that the ratio of the minimum particle size to the maximum particle size is 5/1 or less. Further more preferably, 70% by weight or more, especially more desirably 95% by weight or more, of the alumina particles are fine particles having a particle size falling within the defined range. If alumina particles containing an increased amount of larger particles than those falling within the defined range are used, the specific surface area of the catalyst particles to be obtained is unfavorably small. If, however, alumina particles containing an increased amount of much smaller particles than those falling within the defined range, the sinterability of such alumina particles is elevated so that the particles are sintered easily and, in addition, the particles are easily subjected to phase transition since the nucleation of the α-phase occurs first on the surfaces of the particles. If so, therefore, the catalyst particles to be obtained cannot have the intended heat resistance. The particle size of these particles is measured with a TEM (transmission electron microscope) or SEM (scanning electron microscope).

The alumina particles for use in the present invention may be either monocrystalline or polycrystalline. It is desirable that the alumina particles have, as the crystalline phase, a γ (gamma)-phase or a δ (delta)- or θ (theta)-phase which is a higher-temperature phase than said γ-phase. Especially preferred for use in the present invention is a powder of alumina particles prepared by a dry process, in which the particles are agglomerated little.

As the catalytic component employed in the present invention are metals that are generally used as catalyst, including, for example, Ti, V, Cr, Mn, Fe, Co, Ni, Cu, Mo, Tc, Ru, Rh, Pd, Ag, La, Ce, other lanthanides, Hf, Ta, W, Re, Os, Ir, Pt, Au, and their compounds (e.g., oxides, etc.). These catalytic components are carried on the above-mentioned alumina particles. These catalytic components may be previously carried on the alumina particles. Means therefor may be an ordinary method comprising preparing a solution of a catalytic component followed by making alumina particles kept in contact with the solution. One or more catalytic components may be carried on the alumina particles. The amount of the catalytic component to be carried on the alumina particles may be varied, depending on the use and the object of the catalyst to be produced. The alumina particles with catalyst may be either such that all the particles carry one or more catalytic components or such that only a part of the particles carry them. The same shall apply to the particles with catalyst that will be referred to hereinunder.

The substance (a) is a powder of silica particles, of which 50% by weight or more have a particle size of 100 nm or less. If silica particles comprising an increased amount of larger particles having a particle size larger than the defined range are used, the particles cannot be sufficiently dispersed between alumina particles and therefore they exhibit only an insufficient effect to improve the heat resistance of the catalyst to be produced.

The ratio of the substance (a) to the powder comprising alumina particles with catalyst is not specifically defined. However, it is to be noted that the reduction in the specific surface area of the alumina particles at high temperatures of 1200° C. or higher is caused by the phase transition of said alumina to α-alumina. The phase transition into α-alumina depends on the amount of silica in the starting materials or, namely, silica acts to inhibit alumina from being converted into α-alumina. For this reason, therefore, it is desirable that the ratio of silica to alumina is such that silica is from 0.1 to 30% by weight relative to the total amount of silica and alumina. If the proportion of silica is less than 0.1% by weight, the effect of silica to inhibit the phase transition of alumina into α-alumina is insufficient. If, however, the proportion of silica is more than 30% by weight, the amount of excess silica that is unnecessary to prevent the phase transition into α-alumina is increased. Desirably, the proportion of silica is from 1 to 20% by weight, more desirably from 3 to 15% by weight.

The substance (b) is a sol dispersion of silica particles, of which 50% by weight or more have a particle size of 100 nm or less.

If a sol of silica particles comprising an increased amount of larger particles having a particle size larger than the defined range is used, the particles cannot be sufficiently dispersed between alumina particles and therefore they exhibit only an insufficient effect to improve the heat resistance of the catalyst to be produced.

The liquid to be used for forming the sol is not specifically defined, provided that it can be sufficiently mixed with mixing media to be used for mixing the sol and alumina.

The sol may be formed by any of methods of preparing ultrafine particles of silica and then dispersing the particles in a liquid, hydrolyzing an alkoxide, neutralizing an alkali silicate, etc.

The ratio of the substance (b) to the powder comprising alumina particles with catalyst is not specifically defined. However, like in the case of the substance (a), it is desirable that the ratio of the substance (b) to the powder of alumina particles is such that the amount of the substance (b) is from 0.1 to 30% by weight, in terms of $SiO_2$, relative to the total amount of the substance (b) and the alumina particles. Desirably, the proportion of the substance (b) is from 1 to 20% by weight, more desirably from 3 to 15% by weight.

The substance (c) is a solution of silica.

As one example of this solution, mentioned is a series of aqueous solutions of alkali metal silicates, which is referred to as water glass. Also mentioned are an aqueous solution of ammonium silicate having ammonium ion in place of the alkali metal ion, etc. Of these, preferred is ammonium silicate, from which the alkali component is vaporized while being calcined. Using this, the heat resistance of the porous catalyst material to be produced is not lowered. The content of silica in the solution is desirably from 0.1 to 30% by weight in terms of $SiO_2$. If the content of silica is less than 0.1% by weight, the effect of silica to inhibit the phase transition of alumina into α-alumina is insufficient. If, however, the content of silica is more than 30% by weight, the amount of excess silica that is unnecessary to prevent the phase transition into α-alumina is increased, resulting in too much production of mullite that caused the reduction in the specific surface area of the catalyst particles to be produced.

The ratio of the substance (c) to the powder comprising alumina particles with catalyst is not specifically defined substance (c) to the powder of alumina particles is such that the amount of the substance (c) is from 0.1 to 30% by weight, in terms of $SiO_2$, relative to the total amount of the substance (c) and the alumina particles. Desirably, the proportion of the substance (c) is from 1 to 20% by weight, more desirably from 3 to 15% by weight. Employing the substance (c) falling within the most narrowly defined range, a porous catalyst material having the highest heat resistance can be obtained.

The substance (d) is a powder comprising alumina/silica particles each of which is composed of both alumina and silica, of which 50% by weight or more have a particle size of 100 nm or less. It is desirable that these particles also do not contain water, such as crystal water, constitution water, etc.

If alumina/silica particles containing therein water, such as crystal water, constitution water, etc. are used, the water is released from the mixture at 500° to 1000° C. when the mixture is dried to remove the mixing medium therefrom or when the dried mixture is calcined with the result that the calcined mixture is sintered to have a reduced specific surface area, because of the same reasons as for the above-mentioned alumina particles. However, water may exist around the alumina/silica particles in the present invention. If alumina/silica particles comprising an increased amount of larger particles having a particle size larger than the defined range are used, it is impossible to produce a porous catalyst product having a large specific surface area since such particles themselves have a small specific surface area. In addition, since such particles cannot be sufficiently dispersed between alumina particles, they exhibit only an insufficient effect to improve the heat resistance of the catalyst to be produced.

It is desirable that the alumina/silica particles containing both alumina and silica in each particle are weakly agglomerated. If alumina/silica particles that have been strongly agglomerated are used, these cannot be broken into primary particles when they are mixed with alumina particles with the result that they cannot also be dispersed between alumina particles.

It is desirable that the ratio of alumina to silica in one alumina/silica particle falls within the range of solid solution of silica in the mullite phase in said particle or, namely, is such that silica/(alumina+silica) is from 24 to 28.2% by weight.

The ratio of the substance (d) to the powder comprising alumina particles with catalyst is not specifically defined. However, it is desirable that the proportion of the substance (d) is from 0.1 to 30% by weight, in terms of $SiO_2$, relative to the total amount of the powder of alumina particles and the substance (d) because of the same reasons as mentioned hereinabove for the substance (c). Using the substance (d) falling within the defined range, its effect to improve the heat resistance of the catalyst product to be produced is satisfactorily large. More desirably, the proportion of the substance (d) is from 1 to 20% by weight, even more desirably from 3 to 15% by weight.

The substance (e) is a sol dispersion of alumina/silica particles each of which is composed of both alumina and silica, of which 50% by weight or more have a particle size of 100 nm or less. If a sol of alumina/silica particles comprising an increased amount of larger particles having a particle size larger than the defined range is used, the particles exhibit only an insufficient effect to improve the heat resistance of the catalyst to be produced since they cannot be sufficiently dispersed between alumina particles.

The liquid to be used for producing the sol of said alumina/silica particles is not specifically defined, provided that it is sufficiently miscible with the medium to be used for mixing said alumina/silica particles and alumina particles.

To produce the sol, for example, a solution of an alkoxide or salt containing both aluminium and silicon may be hydrolyzed or neutralized, or ultrafine alumina/silica particles that have been previously prepared may be dispersed in a liquid.

It is desirable that the ratio of alumina to silica in one alumina/silica particle falls within the range of solid solution of silica in the mullite phase in said particle or, namely, is such that silica/(alumina+silica) is from 24 to 28.2% by weight, like in the substance (d).

The ratio of the substance (e) to the powder comprising alumina particles with catalyst is not specifically defined. However, it is desirable that the proportion of the substance (e) is from 0.1 to 30% by weight, in terms of $SiO_2$, relative to the total amount of the powder of alumina particles and the substance (e) because of the same reasons as mentioned hereinabove for the substance (c). Using the substance (e) falling within the defined range, its effect to improve the heat resistance of the catalyst product to be produced is satisfactorily large. More desirably, the proportion of the substance (e) is from 1 to 20% by weight, even more desirably from 3 to 15% by weight.

The substance (f) is a powder of barium compound particles, of which 50% by weight or more have a particle size of 100 nm or less.

The barium compound includes, for example, barium nitrate, barium acetate, barium formate, barium carbonate, etc. Since sulfates and chlorides often act as catalyst poisons upon noble metals such as platinum, etc., it is recommended not to use these for producing catalytic supports carrying noble metals.

If barium compound particles comprising an increased amount of larger particles having a particle size larger than the defined range are used, the particles exhibit only an insufficient effect to improve the heat resistance of the catalyst to be produced since they cannot be sufficiently dispersed between alumina particles.

To produce a powder of said barium compound particles, for example, employable are the following methods. A sol of a barium compound, such as the substance (g) which will be described in detail hereinunder, is first prepared, and this is dried, for example, by supercritical drying or freeze drying in the absence of the surface tension of the liquid constituting the sol. Alternatively, is employed a dry process wherein a barium compound is dissolved in a liquid such as ethanol or the like, and the resulting solution is exposed to high temperatures and rapidly dried or fired in an oxidative atmosphere. When a powder of barium compound particles is prepared by any of the above-mentioned methods, the barium compound to be used may be any one that can be formed into its solution.

The ratio of the substance (f) to the powder comprising alumina particles with catalyst is not specifically defined. However, it is desirable that the ratio of the substance (f) to the powder of alumina particles is such that the amount of the substance (f) is from 0.1 to 30% by weight, in terms of BaO, relative to the total amount of the substance (f) and the alumina particles. Employing the substance (f) falling within the defined range, the effect of the substance (f) to improve the heat resistance of the catalyst product to be produced is significant. More desirably, the proportion of the substance (f) is from 0.5 to 20% by weight, since the effect of the substance (f) to improve the heat resistance of the catalyst product to be produced is more significant. Even more desirably, the proportion of the substance (f) is from 3 to 15% by weight. Employing the substance (f) falling within the most narrowly defined range, a catalyst product having the highest heat resistance can be obtained.

The substance (g) is a sol dispersion of barium compound particles, of which 50% by weight or more have a particle size of 100 nm or less.

The barium compound includes, for example, barium nitrate, barium acetate, barium formate, barium carbonate, etc.

If barium compound particles comprising an increased amount of larger particles having a particle size larger than the defined range are used, the particles exhibit only an insufficient effect to improve the heat resistance of the catalyst to be produced since they cannot be sufficiently dispersed between alumina particles.

The liquid to be used for preparing the sol of such barium compound particles is not specifically defined, provided that it is sufficiently miscible with the medium to be used for mixing the sol and alumina particles.

To produce the sol of said barium compound particles, for example, employable are the following methods. Barium acetate, barium nitrate, barium formate or the like, of which the solubility in water greatly differs from the solubility thereof in ethanol, is formed into an aqueous solution having a high concentration of said barium compound, and thereafter said aqueous solution is diluted with a large amount of ethanol thereby precipitating fine particles of the compound. In this way, a sol of said barium compound particles is obtained. On the other hand, barium oxide, of which the solubility greatly varies depending on temperature, is dissolved in hot water to form a saturated solution of said compound, and thereafter this solution is rapidly cooled to form a sol of the barium compound particles.

The ratio of the substance (g) to the powder comprising alumina particles with catalyst is not specifically defined. However, it is desirable that the ratio of the substance (g) to the powder of alumina particles is such that the amount of the substance (g) is from 0.1 to 30% by weight, in terms of BaO, relative to the total amount of the substance (g) and the alumina particles. Employing the substance (g) falling within the defined range, the effect of the substance (g) to improve the heat resistance of the catalyst product to be produced is significant. More desirably, the proportion of the substance (g) is from 0.5 to 20% by weight, since the effect of the substance (g) to improve the heat resistance of the catalyst product to be produced is more significant. Even more desirably, the proportion of the substance (g) is from 3 to 15% by weight. Employing the substance (g) falling within the most narrowly defined range, a catalyst product having the highest heat resistance can be obtained.

The substance (h) is a solution of a barium compound.

The barium compound includes, for example, barium nitrate, barium acetate, barium formate, etc.

The concentration of the barium compound in said solution is not specifically defined. However, it is desirable that the concentration is as high as possible in order that the next drying step can be conducted efficiently.

The ratio of the substance (h) to the powder comprising alumina particles with catalyst is not specifically defined. However, it is desirable that the ratio of the substance (h) to the powder of alumina particles is such that the amount of the substance (h) is from 0.1 to 30% by weight, in terms of BaO, relative to the total amount of the substance (h) and the alumina particles. Employing the substance (h) falling within the defined range, the effect of the substance (h) to improve the heat resistance of the catalyst product to be produced is significant. More desirably, the proportion of the substance (h) is from 0.5 to 20% by weight, since the effect of the substance (h) to improve the heat resistance of the catalyst product to be produced is more significant. Even more desirably, the proportion of the substance (h) is from 3 to 15% by weight. Employing the substance (h) falling within the most narrowly defined range, a catalyst product having the highest heat resistance can be obtained.

The substance (i) is a powder of lanthanum compound particles, of which 50% by weight or more have a particle size of 100 nm or less.

The lanthanum compound includes, for example, lanthanum nitrate, lanthanum oxide, lanthanum acetate, lanthanum carbonate, etc.

If lanthanum compound particles comprising an increased amount of larger particles having a particle size larger than the defined range are used, the particles exhibit only an insufficient effect to improve the heat resistance of the catalyst to be produced since they cannot be sufficiently dispersed between alumina particles.

To produce a powder of said lanthanum compound particles, for example, employable are the following methods. A sol of a lanthanum compound is first prepared by taking advantage of the difference in its solubility in different solvents, as in the case of the substance (f) mentioned hereinabove. For instance, lanthanum oxide dissolves well in ethanol but does not dissolve in acetone. By taking advantage of such difference in its solubility, lanthanum oxide is first dissolved in ethanol to form its solution having a high concentration and thereafter this solution is mixed with a large amount of acetone to form a sol of lanthanum oxide. Next, the sol is dried, for example, by superclinical drying or freeze drying in the absence of the surface tension of the liquid constituting the sol, to obtain a powder of lanthanum oxide.

Alternatively, is employed a dry process wherein a lanthanum compound is dissolved in a liquid such as ethanol or the like, and the resulting solution is exposed to high temperatures and rapidly dried or fired in an oxidative atmosphere. When a powder of lanthanum compound particles is prepared by any of the above-mentioned methods, the lanthanum compound to be used may be any one that can be formed into its solution.

The ratio of the substance (i) to the powder comprising alumina particles with catalyst is not specifically defined. However, it is desirable that the ratio of the substance (i) to the powder of alumina particles is such that the amount of the substance (i) is from 0.05 to 30% by weight, in terms of $La_2O_3$, relative to the total amount of the substance (i) and the alumina particles. Employing the substance (i) falling within the defined range, the effect of the substance (i) to improve the heat resistance of the catalyst product to be produced is significant. More desirably, the proportion of the substance (i) is from 0.1 to 20% by weight, since the effect of the substance (i) to improve the heat resistance of the catalyst product to be produced is more significant. Even more desirably, the proportion of the substance (i) is from 0.5 to 10% by weight. Employing the substance (i) falling within the most narrowly defined range, a catalyst product having the highest heat resistance can be obtained.

The substance (j) is a solution of a lanthanum compound

The lanthanum compound includes, for example, lanthanum nitrate, lanthanum oxide, lanthanum acetate, lanthanum carbonate, etc.

The concentration of the lanthanum compound in said solution is not specifically defined. However, it is desirable that the concentration is as high as possible in order that the next drying step can be conducted efficiently.

The ratio of the substance (j) to the powder comprising alumina particles with catalyst is not specifically defined. However, it is desirable that the ratio of the substance (j) to the powder of alumina particles is such that the amount of the substance (j) is from 0.05 to 30% by weight, in terms of $La_2O_3$, relative to the total amount of the substance (j) and the alumina particles. Employing the substance (j) falling within the defined range, the effect of the substance (j) to improve the heat resistance of the catalyst product to be produced is significant. More desirably, the proportion of the substance (j) is from 0.1 to 20% by weight, since the effect of the substance (j) to improve the heat resistance of the catalyst product to be produced is more significant. Even more desirably, the proportion of the substance (j) is from 0.5 to 10% by weight. Employing the substance (j) falling within the most narrowly defined range, a catalyst product having the highest heat resistance can be obtained.

The step of mixing the above-mentioned alumina particles with catalyst and at least one of the above-mentioned substances (a) to (j) is conducted in a mixing liquid as a medium. The mixing liquid is not specifically defined and any one can be employed without problem, provided that it can be easily removed by heating the resulting mixture at 500° C. or lower and that it is not chemically interacted with any of the substances (a) to (j). For instance, the mixing liquid includes water, ethanol, methanol, acetone, etc. More preferred are solvents having a small surface tension. In this mixing step, all the components are mixed in such a way that these become slurry, while being mixed, to give a slurry mixture. When a powder of alumina particles with catalyst is mixed with a powdery component such as the substance (a), a mixing liquid is added thereto and these powders are made into slurry, while being mixed along with the mixing liquid, to form a slurry mixture. The same shall apply to other aspects of the present invention.

To mix the components, it is desirable to use a stirring machine giving small shear stress, for example, a screw agitator or the like, rather than a ball mill. Ultrasonic vibration is effectively employed so as to sufficiently disperse the components.

If the components are mixed insufficiently, the alumina particles with carrier are sintered separately from at least one of the substances (a) to (j) added thereto, when they are calcined. Therefore, such insufficient mixing of the components is undesirable. Concretely, if the alumina particles and at least one of the substances (a) to (j) are mixed in such a degree that the resulting mixture contains large lumps having a size of about 1 μm, such mixing is insufficient. On the other hand, if these components are mixed for a long period of time, using a mixer that gives high energy to them, such as a ball mill, an attrition mill or the like, alumina and at least one of the substances (a) to (j) give firmly agglomerated secondary particles with the result that the powder to be obtained by such mixing is to have a large bulk density. If the powder having such a large bulk density is calcined in the next step, the agglomerated particles are sintered easily so that the finally obtained porous product is to have a small specific surface area. For these reasons, this mixing condition is unfavorable. It is necessary to sufficiently mutually disperse alumina particles and additive particles but it is undesirable to form firmly agglomerated secondary particles in the resulting mixture. It is desirable that the particles to be formed in the mixture are bonded to each other by loose bonding at the fewest possible contact points.

The step of drying the above-mentioned mixture is to remove the liquid medium from the slurry mixture. In this step, the slurry mixture is heated so as to vaporize and remove the liquid medium therefrom. Preferably, the slurry mixture is heated and dried at temperatures higher than the boiling point of the liquid medium contained in the mixture. After this drying step, the dried mixture is heated in the next step. Prior to this heating step, the agglomerations formed in the previous drying step may be broken into pellets of suitable sizes, or these may be shaped into large blocks, using a mold or the like, and thereafter the blocks are broken into small pellets. If desired, the dried mixture may be directly formed into pellets by briquetting or the like, or aggregate of alumina or mullite particles may be added thereto and the resulting mixture is shaped into blocks by extrusion or the like. Also if desired, the dried mixture may be coated onto a honeycomb structure such as a cordierite honeycomb structure or the like and dried thereon to form a monolithic catalyst.

The step of heating the above-mentioned dry mixture is to calcine the mixture to form a porous catalyst. Preferably, the mixture is calcined at temperatures falling between 800° C. and 1500° C. If the mixture is calcined at temperatures lower than 800° C., it is hardly sintered to give a porous material having insufficient strength. If, however, it is calcined at temperatures higher than 1500° C., there is a possibility that the calcined mixture will have a reduced specific surface area.

The calcination may be conducted in air or in an inert gas. The calcination time and the heating speed are not specifically defined.

In the method for producing a catalyst according to the first aspect of the present invention, the catalytic component may be added to the support particles as its solution. The solution of catalyst and the powder comprising alumina particles and at least one of the substances (a) to (j) are uniformly mixed and the catalytic component is carried on the particles of the powder.

According to the method of the first aspect of the present invention, it is more desirable that the above-mentioned alumina particles are first mixed with at least one of the substances (a) to (j) and thereafter mixed with particles having catalytic activity, since it is possible to prevent the particles having catalytic activity from being coated with the said substances (a) to (j).

As the catalytic component, usable is a powder comprising at least one of alumina particles with catalyst, of which 50% by weight or more have a particle size of 100 nm or less, and particles of a substance which is hardly formed into a solid solution or compound with alumina by heat treatment and which has catalytic activity or carries a catalyst. The alumina particles with catalyst are the same as those referred to herein for the first aspect of the invention.

As examples of the substance which is hardly formed into a solid solution or compound with alumina by heat treatment and which has catalytic activity, mentioned are elements of Ti, V, Cr, Mn, Fe, Co, Ni, Cu, Mo, Tc, Ru, Rh, Pd, Ag, La, Ce, other lanthanides, Hf, Ta, W, Re, Os, Ir, Pt, Au, and their compounds such as oxides, etc. It is desirable that 50% by weight of the particles of the substance having activity catalyst have a particle size of 100 nm or less.

The substance which is hardly formed into a solid solution or compound with alumina and which can carry a catalyst includes, for example, Mg, Ca, Sc, Ti, V, Cr, Mn, Fe, Co, Ni, Cu, Sr, Y, Zr, Nb, Mo, Ba, La, Ce, other lanthanides, Hf, Ta, W and their compounds. The substance may act also as a catalyst promoter. It is desirable that 50% by weight of the particles of the substance have a particle size of 100 nm or less.

Preferred examples of the powder of particles of the substance which is hardly formed into a solid solution or compound with alumina by heat treatment and which has catalytic activity are referred to hereinunder. The powder may also be used as a powder of the substance to carry a catalyst, which is hardly formed into a solid solution or compound with alumina by heat treatment. The powder may be added to the raw materials to be processed according to all the aspects of the present invention.

The powder comprises particles of a solid solution composed of ceria and an oxide of at least one element of zirconium and rare earth elements (except cerium) (referred to hereinafter as an oxide of rare earth elements or the like), and 50% by weight of said particles have a particle size of 100 nm or less.

The powder has a large specific surface area at high temperatures. When this is used as a substance having high catalytic activity or as a support carrying a catalyst in the present invention, a porous catalyst material having elevated catalytic activity can be obtained.

The above-mentioned rare earth elements are the elements of the IIIa group in the periodic table, including Sc, Y, La, Pr, etc., except Ce.

Preferably, 80% by weight or more of the particles constituting the powder have a particle size of 30 nm or less.

To produce the powder, employable is a method for mixing a powder of ceria and a compound of at least one element of zirconium and rare earth elements (except cerium) (referred to hereinafter as a compound of rare earth elements or the like), using grinding media. According to this method, the grinding media collide with each other and also against the parts of the mixing device containing them.

According to this method, zirconium and rare earth elements (except cerium) can be sufficiently dissolved into ceria to form particles of solid solution even in the absence of heat. In addition, the powder of the particles thus obtained is extremely fine.

Further, in the case where an oxide of rare earth elements or the like is employed as a raw material, the oxide is dissolved into ceria to form a solid solution. When the compound as a raw material is other than an oxide, upon grinding it reacts with an oxygen in the atmosphere or in a dispersion media, to form an oxide of rare earth elements or the like, and then the oxide is dissolved into ceria to form a solid solution.

The compound of rare earth elements or the like as a raw material may be employed in any form, for example, in particles, lump, or liquid solution. Furthermore, by using the grinding media or grinding device composed of a compound of rare earth elements or the like, abrasion pieces resulted from friction during grinding can be employed as the raw material.

The typical examples of the compound of rare earth elements or the like include oxides, hydroxides, salts, etc.

As the grinding media, mentioned are balls, rods, rollers, etc. The mixing device is composed of containers, screw agitators, screw discs, rollers other than those as grinding media, etc.

For example, when a powder of at least one of zirconia and oxides of rare earth elements (except cerium) and a powder of cerium are mixed in a stirring mill, the balls (grinding media) in the mill collide with each other and also against the inner walls and the stirring blades (parts of the mixing device) of the mill.

It is desirable to add a reducing agent to the powders being mixed, by which the formation of the solid solution of zirconia and rare earth elements (except cerium) in ceria is further promoted.

The reducing agent includes, for example, alcohols such as methanol, ethanol, isopropanol, etc., glycols such as ethylene glycol, etc., glycerins, aldehydes such as acetaldehyde, etc. The reducing agent is first put into the mixing device and thereafter a powder of at least one of zirconia and oxides of rare earth elements (except cerium) and a powder of ceria are added thereto, mixed and dispersed.

To make the particles of the thus-prepared powder carry a catalytic component, any ordinary method such as that mentioned hereinabove can be employed where the particles are kept in contact with a solution of a catalytic component.

[Method for Producing Catalyst—Second Aspect]

The second aspect of the present invention for producing a catalyst comprises the steps of:

mixing a catalytic component, alumina particles of which 50% by weight or more have a particle size of 100 nm or less, and at least one member of an alkoxide group to form a slurry mixture, and hydrolyzing said at least one member of an alkoxide group:
drying the resulting slurry mixture; and
calcining the dried mixture,
said alkoxide group consisting of:
(k) a silicon alkoxide;
(l) an alkoxide of particles each of which is composed of both alumina and silica;
(m) a barium alkoxide; and
(n) a lanthanum alkoxide.

The alumina particles to be employed in the second aspect of the present invention may carry a catalytic component, and these particles are the same as those to be employed in the first aspect of the invention mentioned hereinabove.

The substance (k) is a silicon alkoxide.

The silicon alkoxide includes, for example, silicon tetramethoxide, silicon tetraethoxide, silicon tetraisopropoxide, etc.

The ratio of the substance (k) to the powder comprising alumina particles with catalyst is not specifically defined but desirably falls within a range where silica can be formed into a mullite phase as its solid solution or is such that the ratio of silica/(alumina+silica) is from 24 to 28.2% by weight.

The substance (l) is an alkoxide of alumina/silica particles each of which is composed of both alumina and silica.

The alkoxide includes mixtures each comprising a compound of silicon tetramethoxide, silicon tetraethoxide, silicon tetraisopropoxide or the like to be represented by $Si(OR)_4$ (where $R=CH_3$, $C_2H_4$, $C_3H_7$, etc.) and a compound of aluminium propoxide, aluminium butoxide or the like to be represented by $Al(OR)_3$ (where $R=C_3H_7$, $C_4H_9$, etc.), etc.

The ratio of silica to alumina in one particle of the substance (l) preferably falls within a range where silica can be formed into a mullite phase as its solid solution or is such that the ratio of silica/(alumina+silica) is from 24 to 28.2% by weight.

The ratio of the substance (l) to the powder comprising alumina particles with catalyst is not specifically defined but is preferably such that the proportion of the substance (l) is from 0.1 to 30% by weight, in terms of $SiO_2$ in the particle of the substance (l), relative to the total amount of the substance (l) and the powder comprising alumina particles with catalyst. Employing the substance (l) falling within the defined range, a porous catalyst material having high heat resistance can be obtained. More desirably, the proportion of the substance (l) is from 1 to 20% by weight, even more desirably from 3 to 15% by weight. This is because of the same reasons as those for the substance (c).

The substance (m) is a barium alkoxide.

The barium alkoxide includes, for example, barium propoxide, barium butoxide, etc.

The ratio of the substance (m) to the powder comprising alumina particles with catalyst is not specifically defined. However, it is desirable that the ratio of the substance (m) to the powder of alumina particles is such that the proportion of the substance (m) is from 0.1 to 30% by weight, in terms of BaO, relative to the total amount of the substance (m) and the alumina particles. Employing the substance (m) falling within the defined range, the effect of the substance (m) to improve the heat resistance of the catalyst product to be produced is significant. More desirably, the proportion of the substance (m) is from 0.5 to 20% by weight, since the effect of the substance (m) to improve the heat resistance of the catalyst product to be produced is more significant. Even more desirably, the proportion of the substance (m) is from 3 to 15% by weight. Employing the substance (m) falling within the most narrowly defined range, a catalyst product having the highest heat resistance can be obtained.

The substance (n) is a lanthanum alkoxide.

The lanthanum alkoxide includes, for example, lanthanum propoxide, lanthanum butoxide, etc.

The ratio of the substance (n) to the powder comprising alumina particles with catalyst is not specifically defined. However, it is desirable that the ratio of the substance (n) to the powder of alumina particles is such that the proportion of the substance (n) is from 0.05 to 30% by weight, in terms of $La_2O_3$, relative to the total amount of the substance (n) and the alumina particles. Employing the substance (n) falling within the defined range, the effect of the substance (n) to improve the heat resistance of the catalyst product to be produced is significant. More desirably, the proportion of the substance (n) is from 0.1 to 20% by weight, even more desirably from 0.5 to 10% by weight. Employing the substance (n) falling within the most narrowly defined range, a porous catalyst material having the highest heat resistance can be obtained.

The mixing media and the mixing conditions for mixing the powder of alumina particles with catalyst and at least one alkoxide of the substances (k) to (n) according to the second aspect of the present invention may be the same as those for the first aspect of the invention mentioned hereinabove.

To hydrolyze the alkoxide(s) in the mixture comprising the powder of alumina particles and the above-mentioned alkoxide (s), a dispersing medium in which the alkoxide(s)

and water can be mixed or a dispersing aid for dispersing them is added to the mixture. For example, when ethanol is used as the dispersing medium, this is miscible with both silicon tetraethoxide and water. Although silicon tetraethoxide is insoluble in water, it can be uniformly mixed with water if a small amount of ethanol is added thereto as a dispersing aid. In the resulting mixture, the alkoxide is spontaneously hydrolyzed. If desired, acids or alkalis can be added to the mixture so as to control the hydrolyzing speed. Concretely, when hydrochloric acid or the like is added to the mixture, the hydrolysis of the alkoxide(s) is promoted to give fine particles. An alkali may be added to the mixture so as to retard the hydrolysis of the alkoxide(s). In this case, coated alumina particles are precipitated.

The alkoxide(s) may be hydrolyzed at any desired time, for example, after the powder of alumina particles has been completely mixed with the alkoxide(s) or immediately after these have been mixed together.

The details of the other steps and the materials to be used therein for the second aspect of the present invention are the same as those for the first aspect of the invention, except that the substances (k) to (n) in the former are substituted for the substances (a) to (j) in the latter.

The catalyst of the third aspect of the present is considered to be as follows:

The catalyst comprises: alumina particles, 50% by weight or more thereof having a particle size of 100 nm or less; a substance of at least one of silica, a barium compound and a lanthanum compound, said alumina particles and said substance being present as primary or secondary particles, or said substance adhering onto each of said alumina particles, 50% by weight or more of the total of said alumina particles and said substance having a particle size of 100 nm or less; and a catalytic component carried on said alumina particles and said substance.

As one embodiment where a powder of alumina particles with catalyst, of which 50% by weight or more have a particle size of 100 nm or less, or a powder of at least one substance which is hardly formed into a solid solution or compound with alumina by heat treatment and which carries a catalyst is used as the catalytic component to prepare the catalyst, the catalyst of the present invention comprises alumina particles, of which 50% by weight or more have a particle size of 100 nm or less, particles of the substance which is hardly formed into a solid solution or compound with alumina, and particles of at least one of silica, a barium compound and a lanthanum compound, of which 50% by weight or more have a particle size of 100 nm or less and which exist as primary or secondary particles along with said alumina particles, in such a way that all said particles carry a catalyst, or comprises said alumina particles onto which the substance that is hardly formed into a solid solution or compound with alumina and at least one of silica, a barium compound and a lanthanum compound have adhered in such a way that 50% by weight or more of the thus-coated alumina particles have a particle size of 100 nm or less and that all the coated alumina particles carry a catalyst.

As another embodiment where a powder of at least one substance which is hardly formed into a solid solution or compound with alumina by heat treatment and which has catalytic activity is used as the catalytic component to prepare the catalyst, the catalyst of the present invention comprises: alumina particles, 50% by weight or more thereof having a particle size of 100 nm or less; a substance of at least one of silica, a barium compound and a lanthanum compound, said alumina particles and said substance being present as primary or secondary particles, or said substance adhering onto each of said alumina particles, 50% by weight or more of the total of said alumina particles and said substance having a particle size of 100 nm or less; and a catalytic component carried on said alumina particles and said substance, wherein the catalytic component is a substance which is hardly formed into a solid solution or compound with said alumina particles by calcining, and has catalytic activity.

The catalysts to be produced by the first aspect and the second aspect of the present invention are porous catalysts having excellent catalytic activity and still having a large specific surface area even at high temperatures of 1200° C. or higher. Though not clear, the reasons may be presumed as follows:

According to the method of the first aspect of the present invention, the above-mentioned substances (a) to (j) are intercalated into the alumina particles or between the alumina particles and the catalytically-active particles that have been used as the raw materials during the process of producing the porous catalyst, thereby forming a hardly-sinterable crystalline phase in said particles or between said particles. Since 50% by weight or more of the alumina particles that have been used as the raw material have a particle size of 100 nm or less and therefore said alumina particles are extremely fine, said hardly-sinterable crystalline phase is easily intercalated into the alumina particles. For these reasons, the porous catalyst obtained is such that the alumina particles are bonded together via the hardly-sinterable crystalline phase and therefore have voids therebetween. In the porous catalyst having such structure, nuclei of α-alumina, even though formed in one alumina particle, cannot grow and extend to the adjacent alumina particles to form an α-alumina phase in them since these α-alumina nuclei are blocked by the hardly-sinterable crystalline phase. Therefore, the speed of the α-ation through the porous catalyst is much lower than that through conventional γ-alumina, etc. For these reasons, the porous catalyst of the present invention can have a large specific surface area even at high temperatures of 1200° C. or higher for a long period of time.

According to the second aspect of the present invention for producing a porous catalyst, the above-mentioned alkoxides (k) to (n) which are used as the raw materials are mixed with alumina particles and hydrolyzed, and the resulting hydrolysates are intercalated into the alumina particles to form a hardly-sinterable crystalline phase during the process of producing the porous catalyst, like in the method of the first aspect mentioned in detail hereinabove. Therefore, the porous catalyst thus produced can have a large specific surface area even at high temperatures of 1200° C. or higher for a long period of time. Where particles of a substance which is hardly formed into a solid solution or compound with alumina by heat treatment and which carries a catalyst (particles with catalyst) or particles of said substance which has catalytic activity (catalytic particles) are used as the catalytic component, said particles with catalyst or said catalytic particles are independently intercalated between the porous alumina particles that have been made highly resistant to heat by any of the substances (a) to (n), and therefore said particles with catalyst or said catalytic particles are not sintered but are kept stable between the alumina particles even at high temperatures.

According to the present invent ion that has been described in detail hereinabove, therefore, a porous catalyst having excellent catalytic activity and still having a large specific surface area even at high temperatures of 1200° C. or higher can be produced.

Next, the present invention is described in more detail by means of the following examples, which, however, are not intended to restrict the scope of the present invention.

EXAMPLE 1

7 g of ultrafine silica particles having a mean particle size of 23 nm, of which 95% by weight or more had a particle size of 50 nm or less (calculated based on the theoretical specific gravity of 2), were added to 93 g of ultrafine alumina particles having a mean particle size of 17 nm, of which 95% by weight or more had a particle size falling between 8 nm and 50 nm (calculated based on the theoretical specific gravity of 3.6), and 1000 ml of ethanol were added thereto and mixed for 10 minutes, using a screw agitator. The slurry thus formed is referred to as slurry (1-1). The mean particle size was derived from the specific surface area according to the following equation:

$$D = 6000/(S \times d)$$

where D is the mean particle size (nm); S is the specific surface area (m$^2$/g); and d is the theoretical density (g/cm$^3$).

Next, 10 g of ultrafine alumina particles, of which 95% by weight or more had a particle size falling between 8 nm and 50 nm, were dispersed in 50 ml of water, a solution of platinum nitrate was added thereto, and rhodium nitrate was added thereto and stirred with a glass rod for 5 minutes. By this treatment, one g of platinum and 0.2 g of rhodium were adhered onto said alumina particles. The slurry of these alumina particles is referred to as slurry (1-2).

The slurries (1-1) and (1-2) were mixed and stirred with a screw agitator for 10 minutes and then dried at 120° C. for 10 hours. The thus-obtained solid was ground in a mortar and sieved to fractionate particles having a size of from 0.5 mm to 2 mm. Thus, a catalyst comprising the thus-fractionated particles was obtained.

EXAMPLE 2

94 g of ultrafine alumina particles, of which 95% by weight or more had a particle size falling between 8 nm and 50 nm, were dispersed in 1000 ml of ethanol. 11.1 g of barium sulfate were dissolved in 20 g of water, poured into the ethanol dispersion of alumina and stirred for 10 minutes with a spatula made of a resin. The slurry thus formed is referred to as slurry (2-1).

Next, 10 g of ultrafine alumina particles, of which 95% by weight or more had a particle size falling between 8 nm and 50 nm, were dispersed in 50 ml of water, a solution of platinum nitrate was added thereto, and rhodium nitrate was added thereto and stirred with a glass rod for 5 minutes. By this treatment, one g of platinum and 0.2 g of rhodium were adhered onto said alumina particles. The slurry of these alumina particles is referred to as slurry (2-2).

The slurries (1-1) and (1-2) were mixed and stirred with a screw agitator for 10 minutes and then dried at 120° C. for 10 hours. The thus-obtained solid was ground in a mortar and sieved to fractionate particles having a size of from 0.5 mm to 2 mm. Thus, a catalyst comprising the thus-fractionated particles was obtained.

EXAMPLE 3

84 g of ultrafine alumina particles, of which 95% by weight or more had a particle size falling between 8 nm and 50 nm, were dispersed in 1000 ml of ethanol. 11.1 g of barium sulfate were dissolved in 20 g of water, poured into the ethanol dispersion of alumina and stirred for 10 minutes with a spatula made of a resin. The slurry thus formed is referred to as slurry (3-1).

Next, 200 ml of water were added to 60 g of ultrafine cerium oxide particles containing therein zirconium oxide as its solid solution, of which 70% by weight or more had a particle size of 30 nm, and stirred for 5 minutes with a glass rod. This is referred to as slurry (3-2). On the other hand, 10 g of alumina were dispersed in 30 ml of water, and a solution of platinum nitrate and a solution of rhodium nitrate were added thereto and stirred with a glass rod for 5 minutes. By this treatment, one g of platinum and 0.2 g of rhodium were adhered onto said alumina particles. This slurry is referred to as slurry (3-2).

The slurries (3-1), (3-2) and (3-3) were mixed and stirred with a screw agitator for 10 minutes and then dried at 120° C. for 10 hours. The thus-obtained solid was ground in a mortar and sieved to fractionate particles having a size of from 0.5 mm to 2 mm. Thus, a catalyst comprising the thus-fractionated particles was obtained.

Comparative Example 1

100 g of γ-alumina particles having a specific surface area of 220 m$^2$/g and containing 9% by weight, in terms of La$_2$O$_3$, of lanthanum, of which 95% by weight of more were secondary particles having a particle size of 0.5 μm or more, were dispersed in a beaker filled with 300 ml of water, using a glass rod. A solution of platinum nitrate and a solution of rhodium nitrate were added thereto in order and stirred with a glass rod for 5 minutes. By this treatment, one g of platinum and 0.2 g of rhodium were adhered onto said γ-alumina particles. This slurry was dried at 120° C. for 10 hours.

Next, the thus-obtained powder was shaped in a mold press under pressure of 1 t/cm$^2$. The shaped body was ground in a mortar sieved to fractionate particles having a size of from 0.5 mm to 2 mm. Thus, a catalyst comprising the thus-fractionated particles was obtained.

Comparative Example 2

100 g of γ-alumina particles having a specific surface area of 220 m$^2$/g and containing 9% by weight, in terms of La$_2$O$_3$, of lanthanum, of which 95% by weight of more were secondary particles having a particle size of 0.5 μm or more, were dispersed in 300 ml of water. A solution of platinum nitrate and a solution of rhodium nitrate were added thereto and stirred with a glass rod for 5 minutes. By this treatment, one g of platinum and 0.2 g of rhodium were adhered onto said γ-alumina particles. This is referred to as slurry (4-1).

Next, 60 g of cerium oxide particles containing therein zirconium oxide as its solid solution, of which 95% by weight or more were secondary particles having a particle size of 0.5 μm or more, were added to a beaker filled with 200 ml of water, while stirring with a glass rod, and these were stirred for 5 minutes. This is referred to as slurry (4-2).

The slurries (4-1) and (4-2) were mixed and stirred with a spatula made of a resin for 5 minutes and then dried at 120° C. for 10 hours. The thus-obtained powder was shaped in a mold press under pressure of 1 t/cm$^2$ and the shaped body was ground in a mortar and sieved to fractionate particles having a size of from 0.5 mm to 2 mm. Thus, a catalyst comprising the thus-fractionated particles was obtained.

Test for Evaluating Catalysts:

The heat resistance of these seven catalysts obtained in the above-mentioned Examples 1 to 4 and Comparative Examples 1 to 3 was examined by a heat resistance test, which was conducted as follows: The catalysts were heated in a model exhaust gas atmosphere comprising a mixture of $C_3H_6$, NO, $CO_2$, $O_2$, CO, N($H_2O$; saturated at room temperature) at 1000° C. for 5 hours, at 1100° C. for 5 hours and at 1200° C. for 5 hours. After the heat treatment, the catalytic activity of each catalyst was examined, from which the degree of the lowering of the catalytic activity of each catalyst to be caused by the heat treatment was obtained. An oxidative exhaust gas containing more $O_2$ by 3% than the stoichiometric composition of said model exhaust gas and a reductive exhaust gas containing more $H_2$ by 6% than the stoichiometric composition of said model exhaust gas were alternately applied to the catalysts being heated, at intervals of 5 minutes.

To determine the catalytic activity of the heat-treated catalysts for cracking $C_3H_6$, $C_3H_6$ was continuously heated along with each catalyst at 100° C. to 600° C., whereupon the temperature at which 50% of $C_3H_6$ was cracked (50%-cracking temperature) was measured. The lower the 50%-cracking temperature, the higher the catalytic activity of the catalyst used.

Table 1 below shows the 50%-cracking temperature thus measured for each catalyst, in which the catalytic components and their amounts in each catalyst are shown for reference.

TABLE 1

|  |  | Temperature for Heat Treatment | | |
| --- | --- | --- | --- | --- |
|  |  | 1000° C. | 1100° C. | 1200° C. |
| Example 1 | Pt: 1 g<br>Rh: 0.2 g | 185 | 213 | 225 |
| Example 2 | Pt: 1 g<br>Rh: 0.2 g | 182 | 210 | 223 |
| Example 3 | Pt: 1 g<br>Rh: 0.2 g<br>Ce contained | 160 | 167 | 175 |
| Comparative Example 1 | Pt: 1 g<br>Rh: 0.2 g | 200 | 236 | 246 |
| Comparative Example 2 | Pt: 1 g<br>Rh: 0.2 g<br>Ce contained | 175 | 188 | 210 |

The catalysts of Example 1, Example 2 and Comparative Example 1 all contained 1 g of Pt and 0.2 g of Rh. From the 50%-cracking temperatures of these catalysts heat-treated at 1000° C., 1100° C. and 1200° C., it is understood that the catalytic activity of the catalysts of Example 1 and Example 2 was higher than that of the catalyst of Comparative Example 1. The catalysts of Example 3 and Comparative Example 2 both contained 1 g of Pt and 0.2 g of Rh along with Ce that functions as a catalyst promoter. Also in this group, the catalytic activity of the catalyst of Example 3 was higher than that of the catalyst of Comparative Example 2.

While the invention has been described in detail and with reference to specific embodiments thereof, it will be apparent to one skilled in the art that various changes and modifications can be made therein without departing from the spirit and scope thereof.

What is claimed is:

1. A method for producing a catalyst comprising sequentially the steps of:

mixing a catalytic component, alumina particles of which 50% by weight or more have a particle size of 100 nm or less, and at least one substance to form a slurry mixture;

drying said slurry mixture; and calcining the dried mixture;

wherein said substance is at least one selected from the group consisting of:
  (a) silica particles, of which 50% by weight or more have a particle size of 100 nm or less;
  (b) a sol dispersion of silica particles, of which 50% by weight or more have a particle size of 100 nm or less;
  (c) a solution of silica;
  (d) particles each of which is composed of both alumina and silica, 50% by weight or more of the particles having a particle size of 100 nm or less;
  (e) a sol dispersion of particles each of which is composed of both alumina and silica, 50% by weight or more of the particles having a particle size of 100 nm or less;
  (f) particles of barium compound, of which 50% by weight or more have a particle size of 100 nm or less;
  (g) a sol dispersion of barium compound particles, of which 50% by weight or more have a particle size of 100 nm or less;
  (h) a solution of a barium compound;
  (i) particles of lanthanum compound, of which 50% by weight or more have a particle size of 100 nm or less; and
  (j) a solution of a lanthanum compound;

wherein said catalytic component is at least one catalytic metal selected from the group consisting of: Mg, Ca, Sc, Ti, V, Cr, Mn, Fe, Co, Ni, Cu, Mo, Tc, Ru, Rh, Pd, Ag, La, Ce, Pr, Nd, Pm, Sm, Eu, Gd, Tb, Dy, Ho, Er, Tm, Yb, Lu, Hf, Ta, W, Re, Os, Ir, Pt, Au and oxides thereof.

2. The method for producing a catalyst as claimed in claim 1, in which said catalytic component is carried on said alumina particles.

3. The method for producing a catalyst as claimed in claim 1, in which said catalytic component is in the form of a solution.

4. The method of claim 1, wherein said catalytic component comprises said catalytic metal carried on alumina particles of which 50% by weight or more have a particle size of 100 nm or less.

5. The method of claim 1, in which said catalytic component is a substance which is substantially free of any reaction to form a solid solution or compound with said alumina particles during said calcining step.

6. The method of claim 1, further comprising adding supporting particles for carrying said catalytic component, said supporting particles substantially free of any reaction to form a solid solution or compound with said alumina particles by said calcining step.

7. The method of claim 1, wherein said substance is at least one selected from the group consisting of:

(a) 0.1–30% by weight of silica particles based on the total amount of said substance (a) and said alumina, of which 50% by weight or more have a particle size of 100 nm or less;

(b) 0.1–30% by weight in terms of $SiO_2$ of a sol dispersion comprising of silica particles based on the total amount of said substance (b) and said alumina, of which 50% by weight or more have a particle size of 100 nm or less;

(c) 0.1–30% by weight in terms of $SiO_2$ of a solution of silica based on the total amount of said substance (c) and said alumina;

(d) 0.1–30% by weight in terms of $SiO_2$ of particles each of which is composed of both alumina and silica based on the total amount of said substance (d) and said alumina, 50% by weight or more of the particles having a particle size of 100 nm or less;

(e) 0.1–30% by weight in terms of $SiO_2$ of a sol dispersion of particles each of which is composed of both alumina and silica based on the total amount of said substance (e) and said alumina, 50% by weight or more of the particles having a particle size of 100 nm or less;

(f) 0.1–30% by weight in terms of BaO of particles of barium compound based on the total amount of said substance (f) and said alumina, of which 50% by weight or more have a particle size of 100 nm or less;

(g) 0.1–30% by weight in terms of BaO of a sol dispersion of barium compound particles based on the total amount of said substance (g) and said alumina, of which 50% by weight or more have a particle size of 100 nm or less;

(h) 0.1–30% by weight in terms of BaO of a solution of a barium compound based on the total amount of said substance (h) and said alumina;

(i) 0.05–30% by weight in terms of $La_2O_3$ of particles of lanthanum compound based on the total amount of said substance (i) and said alumina, of which 50% by weight or more have a particle size of 100 nm or less; and (j) 0.05–30% by weight in terms of $La_2O_3$ of a solution of a lanthanum compound based on the total amount of said substance (j) and said alumina.

8. A method for producing a catalyst comprising sequentially the steps of:

mixing a catalytic component, alumina particles of which 50% by weight or more have a particle size of 100 nm or less, and at least one alkoxide to form a slurry mixture;

hydrolyzing said alkoxide;

drying said slurry mixture; and calcining the dried mixture, wherein said alkoxide is at least one selected from the group consisting of:
  (k) a silicon alkoxide;
  (l) an alkoxide of particles each of which is composed of both alumina and silica;
  (m) a barium alkoxide; and
  (n) a lanthanum alkoxide;

wherein said catalytic component is at least one catalytic metal selected from the group consisting of: Mg, Ca, Sc, Ti, V, Cr, Mn, Fe, Co, Ni, Cu, Mo, Tc, Ru, Rh, Pd, Ag, La, Ce, Pr, Nd, Pm, Sm, Eu, Gd, Tb, Dy, Ho, Er, Tm, Yb, Lu, Hf, Ta, W, Re, Os, Ir, Pt, Au and oxides thereof.

9. The method for producing a catalyst as claimed in claim 8, in which said catalytic component is carried on said alumina particles.

10. The method for producing a catalyst as claimed in claim 8, in which said catalytic component is in the form of a solution.

11. The method of claim 8, wherein said catalytic component comprises said catalytic metal carried on alumina particles of which 50% by weight or more have a particle size of 100 nm or less.

12. The method of claim 8, in which said catalytic component is a substance which is substantially free of any reaction to form a solid solution or compound with said alumina particles during said calcining step.

13. The method of claim 5 or 12, in which said catalytic component is a solid solution of ceria and at least one of zirconia and oxides of rare earth elements except ceria or a mixture thereof, 50% by weight of said catalytic component being in the form of particles having a particle size of 100 nm or less.

14. The method of claim 8, further comprising adding supporting particles for carrying said catalytic component, said supporting particles are substantially free of any reaction to form a solid solution or compound with said alumina particles by said calcining step.

15. The method for producing a catalyst as claimed in claim 6 or 14, in which said supporting particles being at least one selected from the group consisting of Mg, Ca, Sc, Ti, V, Cr, Mn, Fe, Co, Ni, Cu, Sr, Y, Zr, Nb, Mo, Ba, lanthanides including La and Ce, Hf, Ta, and W, and compounds thereof.

16. The method of claim 6 or 14, in which said supporting particles are a solid solution of ceria and at least one of zirconia and oxides of rare earth elements except ceria or a mixture thereof, 50% by weight of said supporting particles having a particle size of 100 nm or less.

17. The method of claim 8, wherein said alkoxide is at least one selected from the group consisting of:

(k) 0.1–30% by weight in terms of $SiO_2$ of a silicon alkoxide based on the total amount of said substance (k) and said alumina;

(l) 0.1–30% by weight in terms of $SiO_2$ of an alkoxide of particles each of which is composed of both alumina and silica based on the total amount of said substance (l) and said alumina;

(m) 0.1–30% by weight in terms of BaO of a barium alkoxide based on the total amount of said substance (m) and said alumina; and (n) 0.05–30% by weight in terms of $La_2O_3$ of a lanthanum alkoxide based on the total amount of said substance (n) and said alumina.

* * * * *